United States Patent
Hagemann et al.

[15] 3,692,813
[45] Sept. 19, 1972

[54] STABILIZATION OF ORGANIC ISOCYANATES

[72] Inventors: Hermann Hagemann, Cologne-Flittard; Erwin Muller, Leverkusen; Peter Fischer, Odenthal-Osenau, all of Germany

[73] Assignee: Farbenfabriken Bayer Aktiengesellschaft, Leverkusen, Germany

[22] Filed: Jan. 2, 1970

[21] Appl. No.: 402

[30] Foreign Application Priority Data

Jan. 7, 1969  Germany..........P 19 00 513.1

[52] U.S. Cl. .260/453 SP, 260/45.9 R, 260/77.5 AT, 260/77.5 SS, 260/478, 260/479 C, 260/482 B, 260/482 C, 260/545 R
[51] Int. Cl.............................................C07c 119/04
[58] Field of Search..............260/453 SP, 478, 479 C

[56] References Cited

UNITED STATES PATENTS

| | | | |
|---|---|---|---|
| 3,450,747 | 6/1969 | Smith et al. | 260/479 |
| 3,330,849 | 7/1967 | Ulrich | 260/453 |
| 2,885,424 | 5/1959 | Spiegler | 260/453 |

*Primary Examiner*—Joseph Rebold
*Assistant Examiner*—Dolph H. Torrence
*Attorney*—Robert A. Gerlach and Sylvia Gosztonyi

[57] ABSTRACT

Organic isocyanates are stabilized against decomposition, which results in precipitate formation and discoloration, by the addition of a small amount of an organic isocyanate compound, preferably an oxycarbonyl isocyanate containing at least one —O—CO—NCO group in the molecule. Polyurethane elastomers prepared from isocyanates stabilized in this manner also exhibit a very high resistance to hydrolysis.

3 Claims, No Drawings

STABILIZATION OF ORGANIC ISOCYANATES

This invention relates to organic isocyanates and more particularly to a method of improving their storage stability.

Organic isocyanates find particular application in the preparation of macromolecular products, such as, for example, polyurethane foams and elastomers, however, insoluble or sparingly soluble precipitates have a tendency to form in solutions of aromatic and aliphatic isocyanates which have been in storage for a protracted period of time. At storage temperatures of about 50° C. and upwards, such precipitate formation is greatly accelerated. These precipitates are the result of dimerization and polymerization of NCO groups present in excess in the isocyanates.

Aromatic diisocyanates and in particular 4,4'-diphenylmethane diisocyanate are especially susceptible to precipitate formation under prolonged storage conditions. In addition to forming precipitates the NCO content is markedly reduced, thus predictable and reproducible results are difficult to obtain when using a diisocyanate thus affected in the preparation of macromolecular products such as, for example, polyurethane elastomers and the like.

The aforementioned difficulties have been largely overcome by stabilizing aromatic and aliphatic isocyanates by the addition of sulphonyl isocyanates such as, for example, p-toluene sulphonyl isocyanate, which method of stabilization has been described in U.S. Pat. No. 3,330,849. These sulphonyl isocyanates are usually added so as to comprise from about 0.5 to 5.0 percent by weight of isocyanates and they not only inhibit precipitation phenomena but also increase the light stability of the isocyanates. However, polyurethane elastomers which are prepared from sulphonyl isocyanate stabilized diisocyanates have a serious disadvantage in that they possess a much lower resistance to hydrolysis than polyurethane elastomers prepared from diisocyanates which have not been stabilized. A substantial decline in mechanical properties due to hydrolysis is observed after only 14 days aging at 70° C. and 95 percent atmospheric moisture. This low resistance to hydrolysis is due to the presence of the sulphonyl isocyanate stabilizer, the product of hydrolysis of which catalyzes the hydrolytic degradation of the elastomer.

It is, therefore, an object of this invention to provide a means of stabilizing isocyanates which are devoid of the aforementioned defects. It is another object of this invention to inhibit the formation of precipitates in isocyanates. It is a further object of this invention to improve the light stability of isocyanates. It is yet another object of this invention to provide storage stable isocyanates when stored at room temperature. It is still a further object of this invention to provide storage stable isocyanates stored at elevated temperatures.

The foregoing objects and others which will become apparent from the following description are accomplished in accordance with the invention, generally speaking, by providing storage stable organic isocyanates by the addition of organic isocyanate compounds which contain at least one —O—CO—NCO group in the molecule. Surprisingly, organic isocyanate compounds which contain at least one —O—CO—NCO group in the molecule are found to have an excellent stabilizing effect on isocyanates in that they prevent, for example, the formation of dimerization and polymerization products over prolonged storage periods at either room temperature or elevated temperatures. They differ substantially from the known sulphonyl isocyanate additives in that, in addition to the stabilizing effect, they substantially improve the light fastness of the stabilized isocyanate and the resistance to hydrolysis of the high molecular weight products which can be prepared from isocyanates so stabilized such as, for example, polyurethane elastomers.

Any suitable organic polyisocyanate compounds containing at least one —O—CO—NCO group in the molecule may be used, such as, for example, oxycarbonyl isocyanates having the general formula

$$R+O—CO—NCO)_n$$

where $n$ is a positive integer and R is an organic radical having a valence equal to $n$ and may be selected from the group consisting of alkyl, cycloalkyl, aryl, aralkyl, alkenyl, cycloalkenyl, alkaryl and aralkenyl.

Suitable alkyls are, for example, methyl, ethyl, n-propyl, isopropyl, n-butyl, isobutyl, sec-butyl, t-butyl, n-pentyl and various positional isomers thereof such as, for example, 1-methyl-butyl, 2-methyl-butyl, 3-methyl-butyl, 1,1-dimethylpropyl, 1,2-dimethyl-propyl, 2,2-dimethylpropyl, 1-ethylpropyl, and the like.

Suitable cycloalkyls are, for example, cyclopropyl, cyclobutyl, cycloamyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, cyclooctodecyl, cyclonondecyl, cycloeicosyl, and the like.

Suitable aryls are, for example, phenyl, α-naphthyl, β-naphthyl, α-anthryl, β-anthryl, γ-anthryl, indene, isoindene, acenaphthene, fluorene, phenanthrene, naphthacene, chrysene, pyrene, triphenylene, and the like.

Suitable alkenyls are, for example, ethenyl, 1-propenyl, 2-propenyl, isopropenyl, 1-butenyl, 2-butenyl, 3-butenyl, 1-isobutenyl, 2-isobutenyl, 1-sec-butenyl, 2-sec-butenyl, 1-methylene-2-propenyl, 1-pentenyl, 2-pentenyl, 3-pentenyl, 4-pentenyl, 1-hexenyl, 2-hexenyl, 3-hexenyl, 4-hexenyl, 5-hexenyl, 3,3-dimethyl-1-butenyl, 2,3-dimethyl-1-butenyl, 2,3-dimethyl-2-butenyl, 2,3-dimethyl-3-butenyl, 1-methyl-1-ethyl-2-propenyl; and the various isomers of heptenyl, octenyl, nonenyl, decenyl, undecenyl, dodecenyl, tridecenyl, tetradecenyl, pentadecenyl, hexadecenyl, heptadecenyl, octodecenyl, nondecenyl, eicosenyl, and the like.

Suitable cycloalkenyls are, for example, α-cyclohexyl-ethenyl, β-cyclohexyl-ethenyl, α-cycloheptyl-1-propenyl, β-cycloheptyl-1-propenyl, γ-cycloheptyl-1-propenyl, α-cyclooctyl-2-propenyl, β-cyclo-octyl-2-propenyl, γ-cyclooctyl-2-propenyl, β-cyclononyl-isopropenyl, α-methylene-β-cyclododecyl-ethyl and the like.

Suitable aralkyls are, for example, benzyl, α-phenyl-ethyl, β-phenyl-ethyl, α-phenyl-propyl, β-phenyl-propyl, γ-phenyl-propyl, α-phenyl-isopropyl, β-phenyl-isopropyl, α-phenyl-butyl, β-phenyl-butyl, γ-phenyl-butyl, Δ-phenyl-butyl, α-phenyl-isobutyl, β-phenyl-isobutyl, γ-phenyl-isobutyl, α-phenyl-sec-butyl, β-phenyl-sec-butyl, γ-phenyl-sec-butyl, β-phenyl-t-butyl, α'-naphthyl-methyl, β'-naphthyl-methyl and the like.

Suitable alkaryls are, for example, o-tolyl, m-tolyl, p-tolyl, 2,3-xylyl, 2,4-xylyl, 2,5-xylyl, 2,6-xylyl, 3,4-xylyl, 3,5-xylyl, o-cumenyl, m-cumenyl, p-cumenyl, mesityl, o-ethylphenyl, m-ethylphenyl, p-ethylphenyl, and the like.

Suitable aralkenyls are, for example, $\alpha$-phenyl-ethenyl, $\beta$-phenyl-ethenyl, $\alpha$-phenyl-1-propenyl, $\beta$-phenyl-1-propenyl, $\gamma$-phenyl-1-propenyl, $\alpha$-phenyl-2-propenyl, $\beta$-phenyl-2-propenyl, $\gamma$-phenyl-2-propenyl, $\beta$-phenyl-isopropenyl, phenyl derivatives of the isomers of butenyl, pentenyl, hexenyl, heptenyl and the like.

Oxycarbonyl isocyanates as described above for use in accordance with the process of the invention may be prepared by known processes such as, for example, by the action of oxalyl chloride on carbamic acid esters which are unsubstituted on the nitrogen according to the method given in Belgian Pat. No. 676,342 which is exemplified by the reaction $ROOC \cdot NH_2 + (COCl)_2 \longrightarrow ROOC \cdot NCO + CO_2 + 2HCl.$ Alternatively oxycarbonyl isocyanates may be prepared by the action of N-chlorocarbonyl isocyanate on hydroxy compounds according to the reaction $R—OH + Cl—CO \cdot NCO \longrightarrow R—OCO—NCO.$ Although any compounds which contain at least one —O—CO—NCO group may be used according to the process of the invention, aliphatic and aromatic mono- di- and/or tri-oxycarbonyl isocyanates, wherein $n$ has the value of 1, 2, or 3, are particularly preferred, some examples of which are

|  | Boiling point at— |
|---|---|
| $H_5C_2OOC—NCO$ | 120–121°/760 mm. Hg. |
| $OCN—OCO—(CH_2)_4—OCO—NCO$ | 120–122°/0.5 mm. Hg. |
| $CH_3—(CH_2)_{13}—OCO—NCO$ | 122°/0.04 mm. Hg. |
| $CH_3—CH_2—\underset{\underset{CH_2—OCO—NCO}{\mid}}{\overset{\overset{CH_2OCO—NCO}{\mid}}{C}}—CH_2OCO—NCO$ | 160°/0.05 mm. Hg. |
| 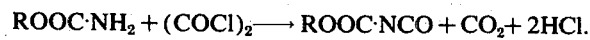 | 115–116°/15 mm. Hg. |
|  | 138–139°/0.09 mm. Hg |

Isocyanates which may be stabilized according to the process of the invention may be of any type such as, for example, aliphatic, cycloaliphatic, araliphatic, alkaryl or aromatic mono-, di and polyisocyanates including 4-phenylbutylisocyanate, phenylisocyanate, o-, m-, or p-toluene-isocyanate, hexamethylisocyanate, cyclohexylisocyanate, phenylene diisocyanates, 2,4- and/or 2,6-toluylene diisocyanate, diphenylmethane diisocyanate and all the isomers thereof such as, for example, diphenylmethane-4,4'-diisocyanate, diphenylmethane-2,4'-diisocyanate, diphenylmethane-2,2'-diisocyanate and mixtures thereof and the like, 4,4'-bis-phenylene diisocyanate, 1,5-naphthalene diisocyanate, hexamethylene diisocyanate, 3-phenylhexamethylene-1,6-diisocyanate, decamethylene diisocyanate, ethylene diisocyanate, butylene diisocyanate, dipropyldiisocyanato ether, 2,2-dimethylpentylene diisocyanate, 3-methoxyhexamethylene diisocyanate, 1,4-butylene glycol propylether diisocyanate, cyclohexylene diisocyanate, undecamethylene diisocyanate, dodecamethylene diisocyanate, 1,3-dimethylbenzene diisocyanate, 1,4-dimethylbenzene diisocyanate, 1,2-dimethylcyclohexane diisocyanate, 1,4-diethylbenzene diisocyanate, 1,4-dimethylnaphthalene diisocyanate, 1,5-dimethylnaphthalene diisocyanate, carbodiimides with free terminal NCO groups, e.g., from polyisocyanates including diisocyanates with catalysts such as phosphine oxides, 1-methylbenzyl-2,4,6-triisocyanate, 1,3,5-trimethylbenzyl-2,4,6-triisocyanate, 3-phenylhexylene-2,4,6-triisocyanate, naphthalene-1,3,7-triisocyanate, 3-methyldiphenylmethane-4,6,4-triisocyanate, 4,4'-dimethyldiphenylmethane-2,2',5,5'-tetraisocyanate, triphenylmethane-4,4', 4'''-triisocyanate, 1,3,5-triisocyanato hexane, 1,3,5-triisocyanatocyclohexane and the like and mixtures thereof.

The reaction products of isocyanates with hydroxy compounds the so-called prepolymers which contain terminal NCO groups are also satisfactorily stabilized by the method of the invention. Among such compounds are, for example, prepolymers of higher molecular weight polyethers or polyesters with diisocyanates or reaction products of di- and tri-functional lower molecular weight hydroxy compounds which have an excess of diisocyanates. Polyaryl polymethylene polyisocyanates obtained by aniline formaldehyde condensation followed by phosgenation may also be satisfactorily stabilized.

To achieve a satisfactory degree of stabilization, it is, in many instances, sufficient to use only comparatively small quantities such as, for example, 0.1 to 5 percent by weight based on the organic isocyanate of the compound used according to the process of the invention. If, for example, the compound of the invention is crystalline, it may be stirred into the molten or liquid isocyanate which is to be stabilized. Isocyanates which have been stabilized in the manner of the invention will remain unchanged for several months at room temperature or even at elevated temperatures. They do not form polymerization products and undergo no substantial yellowing due to exposure to light. Solutions of stabilized isocyanates in solvents, providing such solvents do not contain any groups reactive with isocyanates, also maintain their original properties under storage conditions identical to those hereinabove described.

The invention is further illustrated but is not intended to be limited by the following examples in which all parts and percentages are by weight unless otherwise specified.

EXAMPLE

Comparison test 1

About 80 parts of unstabilized 4,4'-diphenylmethane diisocyanate are stirred at 130° C. into about 200 parts of a polyester of ethylene glycol and adipic acid (OH number 56) which has been dehydrated at about 130°/12 mm Hg, and the diisocyanate is reacted for about 20 minutes at about 130 to about 140° C. 18 parts of butane-1,4-diol are then poured into the melt with vigorous stirring and the homogeneous melt is poured into prepared molds. It solidifies after a few minutes, and after about 24 hours after-heating at about 100° C. it yields an elastomeric synthetic resin which has the following properties:

| Tensile strength kg/cm² | 299 |
|---|---|
| Elongation % | 512 |

| | |
|---|---|
| Permanent elongation % | 11 |
| Loading at 300% kg/cm² | 95 |
| Tear resistance kg/cm | 52 |
| Hardness (Shore A) | 77 |
| Elasticity | 36 |

After about 14 days ageing by hydrolysis at about 70° C. and about 95 percent atmospheric moisture, the following values were determined in these synthetic resins:

| | |
|---|---|
| Strength kg/cm² | 225 |
| Elongation % | 545 |
| Permanent elongation % | 22 |
| Loading at 300% kg/cm² | 75 |
| Tear resistance kg/cm | 42 |
| Hardness (Shore A) | 77 |
| Elasticity | 38 |

EXAMPLE 1

Fifty parts of $CH_3\cdot(CH_2)_{12}-CH_2O-CO-NCO$ are stirred into 5,000 parts of a freshly distilled molten 4,4'-diphenylmethane diisocyanate at about 50° to about 60° C. The melt solidifies on cooling. The stabilized diisocyanate melts at about 39° to about 43° and has an NCO content of about 33.2 percent.

Using the stabilized diisocyanate under the conditions and with the proportions indicated in Comparison Example 1, an elastic synthetic resin which had the following properties was obtained:

| | |
|---|---|
| Tensile strength kg/cm² | 322 |
| Elongation % | 655 |
| Permanent elongation % | 20.5 |
| Loading 300% kg/cm² | 88 |
| Tear resistance kg/cm | 80.5 |
| Hardness (Shore A) | 79 |
| Elasticity | 37 |

After about 14 days aging by hydrolysis, the following values were determined in these synthetic resins:

| | |
|---|---|
| Tensile strength kg/cm² | 235 |
| Elongation % | 682 |
| Permanent elongation % | 33 |
| Loading at 300% kg/cm² | 68 |
| Tear resistance kg/cm | 73 |
| Hardness (Shore A) | 76 |
| Elasticity | 43 |

Comparison test 2

Under the conditions and in the proportions indicated in Example 1 but using a 4,4'-diphenylmethane diisocyanate which has been stabilized according to U.S. Pat. No. 3,330,849 with about 1 percent of p-toluene sulphonyl isocyanate, an elastic synthetic resin which had the following properties was obtained:

| | |
|---|---|
| Tensile strength kg/cm² | 317 |
| Elongation % | 598 |
| Permanent elongation | 16 |
| Loading at 300% kg/cm² | 92.5 |
| Tear resistance kg/cm | 66 |
| Hardness (Shore A) | 82 |
| Elasticity | 39 |

After about 14 days aging by hydrolysis, the following values were determined in this synthetic resin:

| | |
|---|---|
| Tensile strength kg/cm² | 172 |
| Elongation % | 672 |
| Permanent elongation % | 76.5 |
| Loading at 300% kg/cm² | 64 |
| Tear resistance kg/cm | 33 |
| Hardness (Shore A) | 75 |
| Elasticity | 34 |

As can be seen from Comparison Example 2, a severe drop in the tensile strength and tear resistance occurs during the ageing by hydrolysis. The amount of permanent elongation, about 76.5 percent, also indicates hydrolytic degradation.

EXAMPLE 2

Stabilization to light a. Comparison: The color number of unstabilized 4,4'-dimethylmethane diisocyanate (100%) amounted to 1

| | |
|---|---|
| After about 4 weeks it was | 2 |
| of the 20% solution in chlorobenzene: | 1 |
| After about 4 weeks it was | 2 | b. The color number of 4,4'-diphenylmethane diisocyanate which had been stabilized with about 1 percent of $CH_3-(CH_2)_{12}-CH_2-OCO-NCO$ according to Example 1 amounted to 1

| | |
|---|---|
| After about 4 weeks it was | 1 |
| of the 20% solution with chlorobenzene: | 1 |
| after 4 weeks it was | 1 | c. Comparison: The color number of 4,4'-diphenylmethane diisocyanate which had been stabilized with about 1 percent of

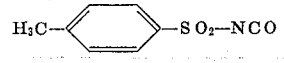

| | |
|---|---|
| amounted to | 1 – 2 |
| After about 4 weeks it was | 3 |
| The 20% solution in chlorobenzene | 1 – 2 |
| After about 4 weeks it was | 3 |

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

What is claimed is:

1. A storage stable aromatic diisocyanate having incorporated therein from about 0.1 percent to about 5.0 percent by weight based on the weight of isocyanate of an oxycarbonylisocyanate compound having the formula $$R-(OCO-NCO)_n$$

wherein $n$ is 1 to 3 and R is an n-valent hydrocarbon radical selected from the group consisting of $C_1$ to $C_{14}$ alkyl, $C_3$ to $C_{20}$ cycloalkyl, $C_6$ to $C_{18}$ aryl, $C_7$ to $C_{11}$ aralkyl, $C_2$ to $C_{20}$ alkenyl, $C_8$ to $C_{13}$ cycloalkenyl, $C_7$ to $C_9$ alkaryl and $C_8$ to $C_{13}$ aralkenyl.

2. The composition of claim 1 wherein the oxycarbonyl isocyanate is selected from the group consisting of

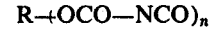

$H_5C_2OOC-NCO$ $OCN-OCO-(CH_2)_4-OCO-NCO$ $CH_3-(CH_2)_{13}-OCO-NCO$

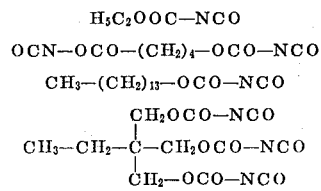

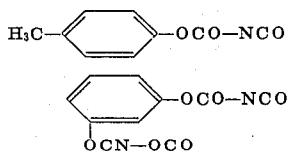
and mixtures thereof.
3. The composition of claim 1 wherein the storage stable organic isocyanate is 4,4'-diphenylmethane diisocyanate.
* * * * *